(No Model.)
J. A. LIST.
WIRE REELING MACHINE.
No. 516,894. Patented Mar. 20, 1894.
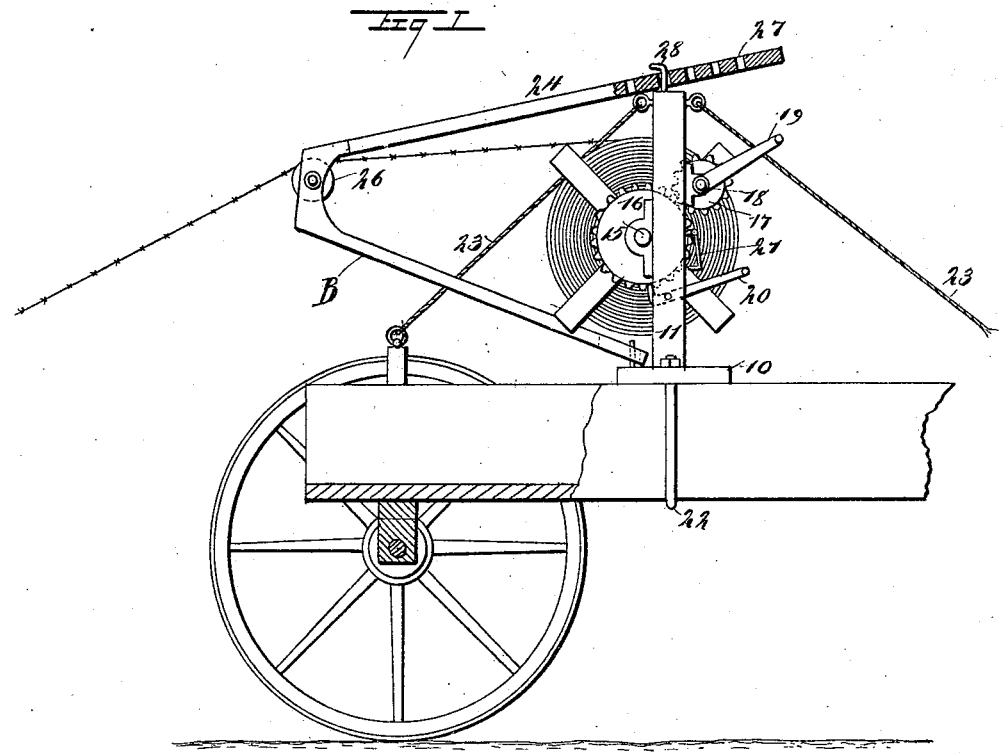
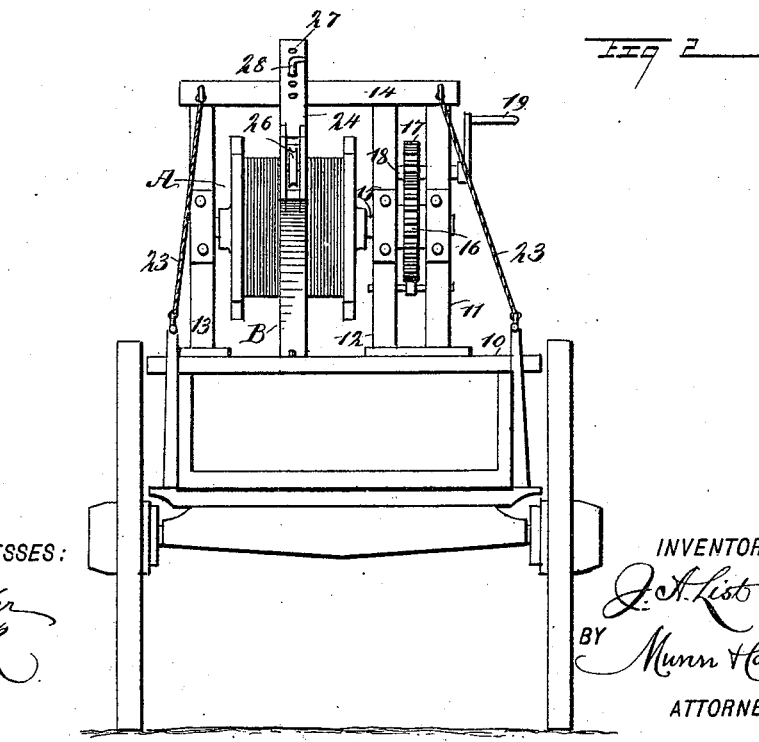
WITNESSES:
H. Walker
C. Sedgwick
INVENTOR
J. A. List
BY
Munn & Co.
ATTORNEYS.

UNITED STATES PATENT OFFICE.

JOHN ANDREW LIST, OF BARTELSO, ILLINOIS.

WIRE-REELING MACHINE.

SPECIFICATION forming part of Letters Patent No. 516,894, dated March 20, 1894.

Application filed July 27, 1893. Serial No. 481,644. (No model.)

*To all whom it may concern:*

Be it known that I, JOHN ANDREW LIST, of Bartelso, in the county of Clinton and State of Illinois, have invented a new and Improved Wire-Reeling Machine, of which the following is a full, clear, and exact description.

My invention relates to an improvement in reels for wire, and it has for its object to provide a reel of exceedingly simple and economic construction, adapted to be mounted upon a wagon or other vehicle, and for winding the wire removed from a wire fence upon the reel, and which may likewise be employed for unwinding or unreeling the wire in the construction of such a fence.

Another feature of the invention is to provide a means whereby, without possible injury to the operator, the wire may be directed across the face of the reel to cause it to wind at either end, or at the center of the reel, as may be required.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in both views.

Figure 1 is an end view of the reel, illustrating it as mounted upon a vehicle, and a portion of the vehicle being in section; and Fig. 2 is a side view of the reel mounted on the vehicle.

In carrying out the invention the frame of the reel consists of a base 10 from which three standards are usually projected, designated respectively as 11, 12 and 13. Two of the standards 11 and 13 are the outer standards, while the standard 12 is located nearer the standard 11 than the standard 13, and all three of the standards are tied in position and braced by means of an upper cross-bar 14.

A reel A, of suitable construction to receive wire, is mounted upon a shaft 15, the shaft and reel turning together. The shaft is journaled in bearings formed upon the three standards 11, 12 and 13, while the reel is located between the intermediate standard 12 and the outer standard 13, as is best shown in Fig. 2. That portion of the shaft between the intermediate and outer standards 11, is provided with a gear 16, firmly secured to it, and the gear is made to mesh with a pinion 17, located upon a short shaft 18, journaled preferably upon the opposite side of the frame to that at which the reel shaft is journaled; and the pinion shaft 18, is provided with a crank 19, or the equivalent thereof, through the medium of which the pinion shaft and consequently the reel shaft are revolved.

A pawl 20, is pivoted upon one of the standards, the standard 11, preferably, and the said pawl is adapted to engage with the teeth of the gear 16, its engaging end being heavier than its handle end. When the reel is to be used the pawl is disengaged from the gear and is held out of engagement by a hook 21, or the equivalent thereof, connected with the frame and adapted for engagement with the handle end of the pawl.

The base 10 of the machine may be secured to any desired support in any approved manner. When it is placed upon a wagon, clamps 22 of any approved type are utilized to attach it to the wagon body, standing transversely across the body as shown in the drawings, and in order to brace the machine and maintain it steady, guy ropes or chains 23, are attached to the frame at opposite corners, and are carried in direction of both front and rear, the other ends of the ropes, chains or cables being secured to the body of the wagon in the most convenient manner.

In connection with the machine a guide arm B, is employed. This guide arm is of essentially angular construction, and comprises two members 24 and 25, arranged at more or less of an acute angle to one another; and at the junction of the members a space is provided in which a pulley 26, is journaled.

The upper member 24 of the guide arm is preferably made longer than the lower member 25; and the longer member is provided with a series of apertures 27, produced longitudinally in it. The arm is pivotally connected with the top of the frame, preferably over the central portion of the reel, by means of a pin, bolt or hook 28, or its equivalent, passed through one of the apertures 27, and then into the upper cross bar of the frame. According to the aperture through which the pin or hook is passed, the end of the arm carrying the pulley will be raised or lowered, as the shorter member of the arm is adapted to rest upon the bottom of the wagon, or upon any convenient support. As shown in the drawings the member 25 of the arm rests upon the base 10 of the reel and is detachably secured thereto by passing a pin, bolt or hook through an aperture in said member and into the base 10, such attachment being similar to that employed with reference to the member 24.

As shown in Fig. 1, the wire is passed from the object to which it may be attached to the reel over the guide pulley 26; and in unreeling the wire may be carried from the reel likewise over the pulley. It is therefore evident, that since the guide arm is pivoted upon the frame it may be swung in direction of either end of the reel, or placed over the center, and thus the wire may be directed to any point upon the reel to insure an even winding of the wire. It is further evident that the guiding of the wire may be accomplished without danger of the wire coming in contact with the manipulator, as the end of the arm extending forwardly over the frame may be used as a handle by which to operate the arm, or it may be operated from the rear of the vehicle.

The reel is adapted for use wherever wire is to be wound up, as, for example, when the fence is taken down, or where a wire fence is to be erected. When the reel is in operation, the pawl is held out of engagement with the gear 16; but when it is desired to stop the operation of the reel, by engaging the pawl with the gear the reel can not be operated.

Having thus described my invention, I claim as new and desire to secure by Letters Patent—

1. The combination with a reel, of a guide arm provided with two members, and carrying a guide pulley over which the wire is adapted to be passed to the reel, one of said members having a series of apertures produced longitudinally therein, whereby it may be adjustably pivoted to the frame and the other member adapted to engage with a convenient support, substantially as set forth.

2. The combination, with a reel, of a guide arm provided with two members arranged at angles to one another, one of which members is pivotally located over the reel, the other members engaging with a convenient support, and a guide pulley located near the junction of the members, over which the wire or article reeled is to be passed, substantially as shown and described.

3. The combination with a reel, of a guide arm provided with two members arranged at angles to each other and carrying a guide pulley located near the junction of the members, the lower member adapted to engage with a convenient support, the upper member being provided with a series of apertures by which it may be pivotally connected to the frame and adjusted lengthwise to raise and lower the pulley, substantially as set forth.

4. The combination, with a frame, a shaft journaled therein and provided with an attached gear and an attached reel, a driving gear connected with the reel shaft gear, and a pawl adapted for engagement with the said reel shaft gear, of a guide arm comprising two members placed at angles to each other, one of the members being carried over the reel and adjustably and pivotally connected with the frame, and a guide pulley located in the guide arm near the junction of its members, and adapted as a guide for the wire to be reeled and unreeled, substantially as shown and described.

JOHN ANDREW LIST.

Witnesses:
HARVEY F. JONES,
GEO. A. BACON.